United States Patent [19]

Shaw et al.

[11] Patent Number: 4,553,238

[45] Date of Patent: Nov. 12, 1985

[54] FIBER OPTIC AMPLIFIER

[75] Inventors: Herbert J. Shaw, Stanford; Michel J. F. Digonnet; Robert A. Lacy, both of Palo Alto, all of Calif.

[73] Assignee: The Board of Trustees of the Leland Stanford University, Stanford, Calif.

[21] Appl. No.: 537,493

[22] Filed: Sep. 30, 1983

[51] Int. Cl.⁴ .............................................. H01S 3/30
[52] U.S. Cl. .................... 372/6; 350/96.15; 372/70; 372/66
[58] Field of Search .............................. 372/6, 70, 66; 350/96.15

[56] References Cited

U.S. PATENT DOCUMENTS 3,230,474  1/1966  Keck et al. ............................. 372/70
3,779,628  12/1973 Kapron et al. ..................... 350/96.15
4,136,929  1/1979  Suzaki ..................................... 372/6

Primary Examiner—William L. Sikes
Assistant Examiner—Léon Scott, Jr.
Attorney, Agent, or Firm—Knobbe, Martens, Olson & Bear

[57] ABSTRACT

A pair of small diameter optical fibers are arranged in a side-by-side configuration, the first fiber providing a passive guide for pump light, and the second fiber formed of a material, such as Nd:YAG which has amplifying properties at the signal frequency. The signal to be amplified propagates through the second fiber from the active material, resulting in amplification of the signal. The first fiber is pumped from one or both ends, utilizing a cone shaped rod which is optically coupled thereto. A large diameter beam of collimated pump light enters the cone shaped rod, where total internal reflections on the cone walls compress the beam to a small, fiber-size diameter for absorption by the active fiber. The light input to the cone-shaped rod is produced by plural, high power laser diodes, and is collimated by microlenses. By utilizing the cone-shaped rod to couple light from the high power diode lasers to the pump fiber, high pump power densities can be achieved, yielding increased amplification.

13 Claims, 11 Drawing Figures

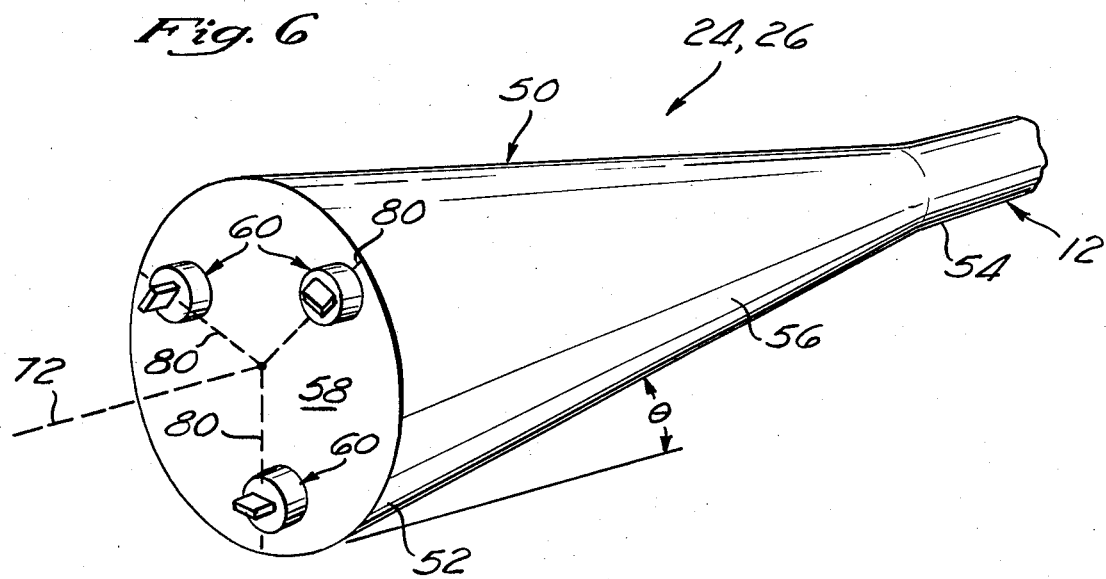
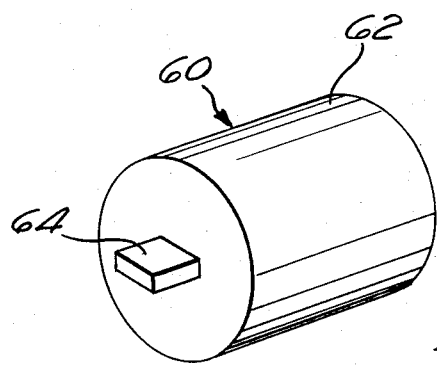
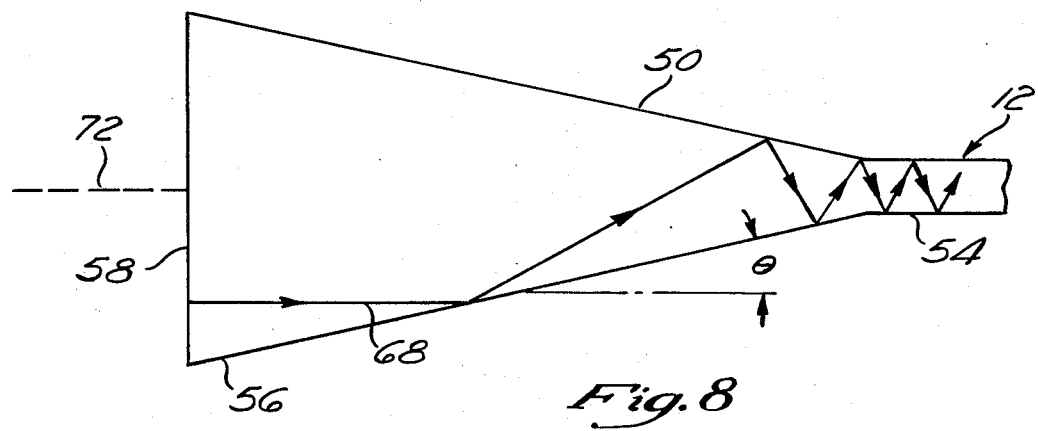

FIBER OPTIC AMPLIFIER

BACKGROUND OF THE INVENTION

The present invention relates to fiber optic amplifiers. The Government has rights in this invention pursuant to Contract Number F33615-79-C-1789, awarded by the Department of The Air Force, Air Force Office of Scientific Research. This invention comprises an improvement of the invention described in copending patent application, Ser. No. 448,707, filed Dec. 10, 1982, entitled "Fiber Optic Amplifier".

The concept of optical amplifiers, based upon the lasing capability of certain materials, particularly on a macroscopic level, is well known. Thus, for example, it is known to place a pumping light source and a single crystal neodymium-yttrium aluminum garnet (Nd:YAG) rod, several millimeters in diameter and several centimeters in length, in a tubular reflective cavity. For example, the light source and Nd:YAG rod may be located, respectively, to extend along the two foci of a cavity having an elliptical cross section. In such an arrangement, light emitted by the light source and reflected from the cavity walls will impinge upon the Nd:YAG rod. The light source is preferably selected to emit wavelengths corresponding to the absorption spectra of the Nd:YAG crystal so that the energy states of the neodymium ions of the crystal are inverted to an energy level above the upper laser level. After inversion, an initial relaxation of then neodymium ions through phonon radiation yields anion population at the upper laser level. From the upper laser level, the ions will relax, to a lower energy level, emitting light of a wavelength which is characteristic of the Nd:YAG material. Advantageously, this lower energy level is above the ground level for the ions so that a rapid, phonon-assisted relaxation will occur between this lower energy level and the ground level, enabling a high inversion ratio to continue to exist between the upper laser level and this lower energy level, within the pumped ions.

With the population so inverted, as is well known from laser technology, the Nd:YAG will also provide fluorescence, that is, random emission of incoherent light. This spontaneous radiation takes place with a time constant equal to the average lifetime of the inverted state, about 230 microseconds for Nd:YAG.

If, after the neodymium ions of the Nd:YAG rod have been inverted, a light signal at the laser transition frequency is transmitted through the rod, the signal photons will trigger the transition of the neodymium ions, to the lower energy level, causing coherent emission of stimulated radiation, which will effectively add to the transmitted signal, thus amplifying this signal.

The absorption length of the Nd:YAG crystal at the pump wavelength (i.e., the length of material through which the illumination must traverse before 60% of the illumination is absorbed) is typically about 2 millimeters or more, and thus the Nd:YAG crystals used in amplifying structures have had diameters at least this large so that the crystal could absorb a substantial portion of the pumping radiation during the initial reflection from the cavity walls and passage through the crystal. If, during this initial traverse through the crystal, the pumping illumination is not absorbed, it is likely to be reflected by the cavity walls back to the light back to the light source, where it will be reabsorbed, it is likely to be reflected by the cavity walls back to the light source, where it will be reabsorbed, generating heat in the light source and reducing the overall efficiency of the amplifier.

When such large diameter Nd:YAG rods are used as amplifiers in fiber optic systems, it has been thought necessary to use optical components, such as lenses, to focus the light signal from the optical fiber into the Nd:YAG rod, and the amplified light signal from the Nd:YAG rod back into another fiber. Such optical systems require careful alignment and are susceptible to environmental changes, such as vibration, and thermal effects. Additionally, the optical components and the size of the Nd:YAG rod make the amplifying system relatively large, and thus impractical for certain applications. Furthermore, the large size of the Nd:YAG rod requires a large mount of input pump energy in order to maintain a high energy density within the rod and allow for a significant optical gain. Such large pump power requires high output pump light sources, generating substantial heat which must be dissipated, typically by liquid cooling of the cavity.

While amplifiers of this type are useful in many applications, such as some communications applications, use in a recirculating fiber optic gyroscope puts severe restrictions upon the amplification system. With such gyroscopes, optical fiber, typically a kilometer or more in length, is wound into a loop, and a light signal is recirculated within the loop, typically in both directions. Motion of the loop causes a phase difference between the counter-propagating light signals which may be used to measure gyroscope rotation. In such gyroscopes, the phase difference induced in one signal pass around the fiber is relatively small, and it is advantageous to recirculate input light within the loop as many times as possible to increase this phase difference.

In traversing a kilometer of optical fiber, an optical signal will typically lose 30 to 50 percent of its intensity. If an amplifier were placed in series with the loop, and were capable of amplifying the bidirectional counter-propagating light signals by 2 to 3 dB, it would permit a light signal to propagate many times within the loop.

Unfortunately, the relatively large size, high power and cooling requirements of prior art Nd:YAG rod amplifiers, as described above, makes such amplifiers relatively impractical for high accuracy gyroscopes. These factors, of course, also limit the utility of such amplifiers in other applications, such as communication networks.

SUMMARY OF THE INVENTION

The present invention is a fiber optic amplifier which comprises a pump fiber having a first refractive index and an amplifier fiber, having a second refractive index, higher than the first refractive index. The pump fiber may be comprised of a passive material, such as quartz while the amplifier fiber is comprised of an active laser material, such as Nd:YAG. The two fibers are positioned in close proximity to form an interaction region for transferring light from the first fiber to the second fiber.

A cone shaped rod is utilized to introduce pump light into the pump fiber. Preferably, the rod and pump fiber are integrally formed from the same material, such as quartz. The rod includes a first end which is sized to introduce light into one end of the pump fiber, and a second end, which has a diameter substantially larger than the first end. A light source introduces light into the larger second end, and the cone shaped rod focuses this light into the smaller fiber sized first end for introduction into the pump fiber. The pump light is transferred from the pump fiber to the amplifier in the interaction region, and is absorbed by the amplifier to cause an electronic population inversion in the laser material.

Preferably, the light source comprises a collimating light source which produces substantially collimated light. In the preferred embodiment, this collimating light source includes a laser diode and a collimating microlens, which is disposed between the laser diode and the second end of the cone shaped rod. If desired, additional sets of laser diodes and collimating lenses may be added to increase input power to the second end of the cone shaped rod. Further, in order to increase the absorption of light per unit of length of the amplifier fiber, it may be advantageous to mount the laser diodes so as to intoduce light into the rod at a location which is offset from the rod axis to cause excitation of high order modes. In such case, the laser diodes should preferably be mounted such that the lengthwise dimension of the emitting area is normal to a radial line passing through the rod axis.

The power input to the pump fiber may be further increased by placing a second pump source at the opposite end of the pump fiber, so that the pump fiber is pumped from both directions. This is particularly advantageous when the amplifier of the present invention is used in a system in which waves propagate through the amplifier fiber in opposite directions, such as in a Sagnac gyroscope. Such second pump source likewise comprises a cone shaped rod, laser diode, and collimating microlens, as described above. In addition, for presently available high power laser diodes, which typically have poor spatial coherence or are multimode, it is preferable that the length of the emitting area of such laser diode be no greater than the diameter of the smaller fiber sized end of the cone shaped rod.

The present invention also includes a method of pumping a optical amplifier, which comprises the steps of supplying pump light to one end of the cone shaped rod, and optically coupling the other end of the rod to pump the amplifier fiber. The step of supplying pump light preferably comprises placing a collimating microlens between a light source and the rod, so that the input pump light is collimated.

BRIEF DESCRIPTION OF THE DRAWINGS

These and other advantages of the present invention are best understood through the following description, which references the drawings, in which:

FIG. 6 is a perspective view of a preferred pump source for the amplifier structure of FIG. 1, which shows plural laser diodes and collimating microlenses mounted to input collimated light to a cone-shaped rod;

FIG. 7 is a perspective enlarged view of one of the laser diodes and collimating lenses of FIG. 6; and FIG. 8 is an schematic drawing showing the path of an exemplary ray input to the cone shaped rod, and illustrating the multiple total internal reflections of that ray as it propagates from one end of the cone to the other;

DETAILED DESCRIPTION OF THE PREFERRED EMBODIMENT

Figure 1:
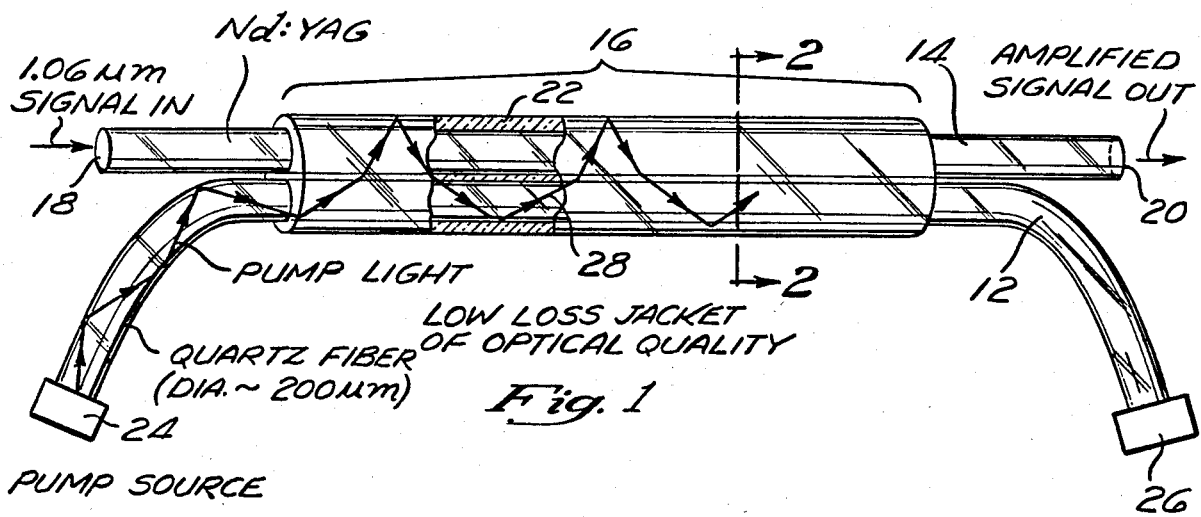
FIG. 1 is a diagram showing the physical arrangement of the preferred embodiment of the fiber amplifier of the present invention.
Figure 2:
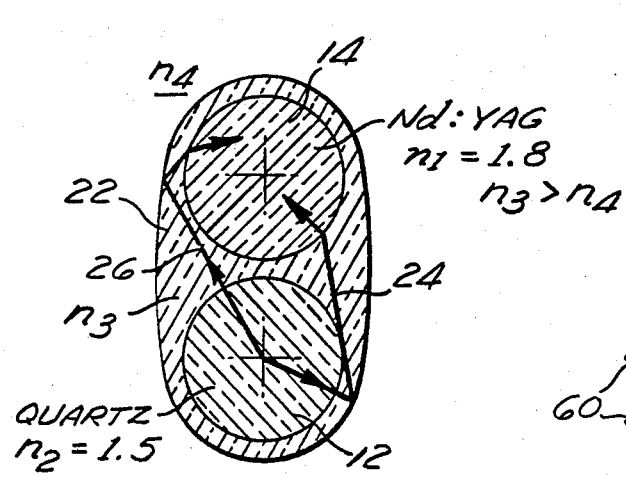
FIG. 2 is a sectional view of the arrangement of FIG. 1 taken along lines 2—2 of FIG. 1.

Referring initially to FIGS. 1 and 2, the preferred embodiment of this invention comprises a side pumped amplifier which includes a pumping fiber 12 and a signal fiber 14. The pumping fiber 12 is typically a quartz fiber which, in an exemplary configuration, has a diameter of approximately 200 microns. This fiber 12 extends parallel to, and in close proximity with, the signal fiber 14 through a length 16 of approximately 2 centimeters, to provide an interaction region along such length 16. The signal fiber 14 is a laser material, which may comprise e.g. a single crystal of ion doped material which, when pumped, will exhibit optical gain at the frequency of the signal to be amplified. In the diagram of FIG. 1, and for the description which follows, it will be assumed that the input light signal, which is to be amplified, is input to a first end 18 of the signal fiber 14 and is output, after amplification, from a second end 20 of the fiber 14. It should be recognized, however, that in many applications, such as communication and rotation sensing applications, signals will be input at both ends 18, 20 of the fiber 14 and will be amplified regardless of the direction of propagation through the fiber 14.

The fiber 14, in this exemplary embodiment, has a diameter of 100 microns. Throughout the length 16 of the parallel extension of the fibers 12 and 14, these fibers are encapsulated within a jacket 22 which, as will be explained further below, provides a waveguide for the illumination used to pump the fiber 14. In the preferred embodiment, both of these fibers 12, 14 are unclad, except to the extent that the jacket 22 provides a cladding.

The fiber 14 is formed as a single crystal of Nd:YAG material. A pair of light sources 24, 26 are coupled to the opposite ends of the pump fiber 12 to provide light energy, or pumping light, for inverting the neodymium ion electronic population within the Nd:YAG crystal 14 to permit amplification.

The fiber 12, as well as the jacket 22, are transparent to the wavelength of light from the pumping sources 24, 26. It is preferable that the jacket 22 have as low a loss characteristic at this frequency as possible, whereas it is advantageous to have the absorption length of the Nd:YAG fiber 14 at this frequency as short as possible.

The indices of refraction of the fibers 12, 14 and the jacket 22 are selected to permit the signal fiber 14 to guide the signal input at its end 18. However, the indices are also selected to allow light from the pumping sources 24, 26 to enter the jacket 22 from the fiber 12 and to thereafter periodically enter and be absorbed by the fiber 14. Thus, as is shown in the example of FIG. 2, the Nd:YAG fiber 14 has a refractive index $n_1$ equal to approximately 1.8. The quartz fiber 12, on the other hand, has an index of refraction $n_2$ of about 1.46. The index of refraction of the jacket 22, $n_3$, is selected to be between 1.46 and 1.8, so that $n_1 > n_3 > n_2$. Finally, the refractive index surrounding the jacket 22, $n_4$ is formed by air, although it should be understood that a secondary cladding may surround the jacket 22 to eliminate losses which may otherwise occur at the interface between the jacket 22 and the surrounding air, due to surface irregularities, and resultant scattering, in the jacket 22.

From the above description, it will be understood that, because the refractive index $n_1$ of the fiber 14 is greater than the refractive index $n_3$ of the jacket 22, signals input at the end 18 of the fiber 14, which are to be amplified by the system, are well guided within the fiber 14. Because the refractive index $n_2$ of the quartz fiber 12 is less than the refractive index $n_3$ of the jacket 22, the pumping light from the sources 24, 26 will not be guided by the fiber 12, but will be refracted into the jacket 22. However, this light, as shown by the exemplary rays 24 and 26 of FIG. 2, and 28 of FIG. 1, will be well guided by the jacket 22, since the index of refraction $n_3$ of the jacket 22 is greater than the index of refraction $n_4$ of the surrounding material. Thus, the pumping illumination will be guided within the confines of the jacket 22 for ultimate absorption by the fiber 14. As shown in FIG. 1, the pumping illumination, exemplified by the ray 28, will be absorbed by the fiber 14 at a rate which is proportional to the ratio of the path length through the fiber 14 to the total path length. For this reason, it will be understood that it is advantageous to maintain the envelope size of the jacket 22 as small as possible to increase the absorption per unit length in the Nd:YAG fiber 14.

Figure 3:
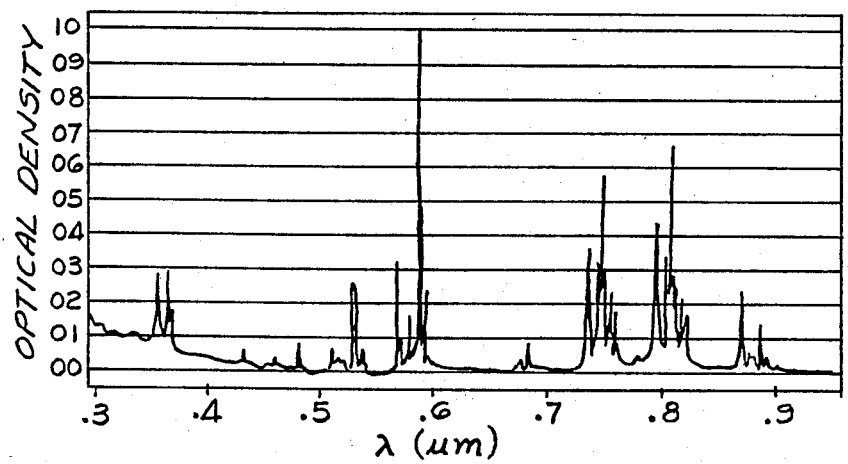
FIG. 3 is a diagram showing the absorption spectrum of Nd:YAG of 300° K.

Referring now to FIG. 3, which is a diagram of the absorption spectrum of Nd:YAG crystal at 300° K., it can be seen that the Nd:YAG material has a relatively high optical density, and thus a short absorption length, at selected wavelengths. For this reason, it is advisable to select the pumping illumination sources 24, 26 (FIG. 1) to emit radiation at these frequencies in order to (a) maximize the absorption of the pumping illumination in the Nd:YAG fiber 14, and thus, to allow the length 16 (FIG. 1) of the absorption region to be as short as possible while still permitting substantially complete absorption of the pumping illumination within the amplifier structure. Those skilled in the art will understand that it is advantageous to make the fiber 14 as short as possible to reduce propagation losses of the signal through the fiber 14. As can be seen from FIG. 3, the wavelength 0.58 microns is best suited for the illumination sources 24, 26 in this exemplary embodiment, although the wavelengths 0.75 and 0.81 microns are also relatively well suited.

Figure 5A:
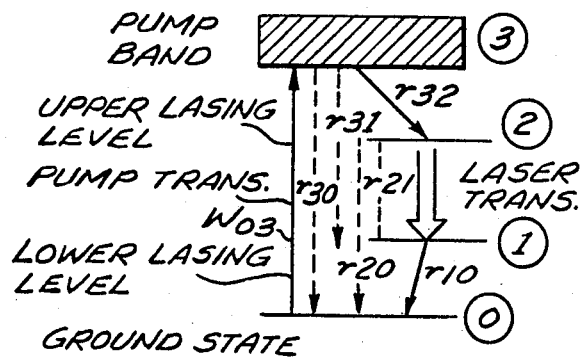
FIG. 5 is a simplified energy level diagram of a four-level laser, such as Nd:YAG.
Figure 5B:
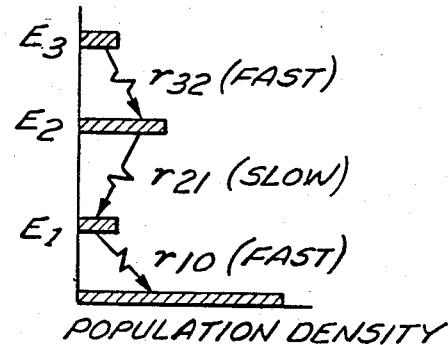

Referring now to FIG. 5A, which is an energy level diagram for the Nd:YAG crystal, it will be understood that, when pump light at the absorption wavelength, described above, is absorbed by the Nd:YAG crystal, the neodymium ions are excited from the ground state to the pump band. From the pump band, the ions quickly relax, through phonon interactions, to the upper laser level. From this upper laser level, the neodymium ions will fluoresce to the lower laser level. From this latter level, a final, rapid phonon relaxation occurs to the ground state. This latter rapid relaxation in a four-level laser system of the type shown in FIG. 5A is advantageous, as it provides a practically empty lower energy level. This feature is shown in FIG. 5B, in which the population densities at the pump band, upper laser level, lower laser level, and ground state are shown for an Nd:YAG fiber during continuous pumping. Because the rate of fluorescence between the upper and lower laser levels in relatively slow in comparison with the phonon relaxation between the pump band and the upper laser level, as well as between the lower laser level and the ground state, the population density at the upper laser level is substantially higher than that at the lower laser level, yielding a high inversion ratio. The average lifetime of the upper laser level, prior to stimulated emission, is 230 microseconds.

Figure 4:
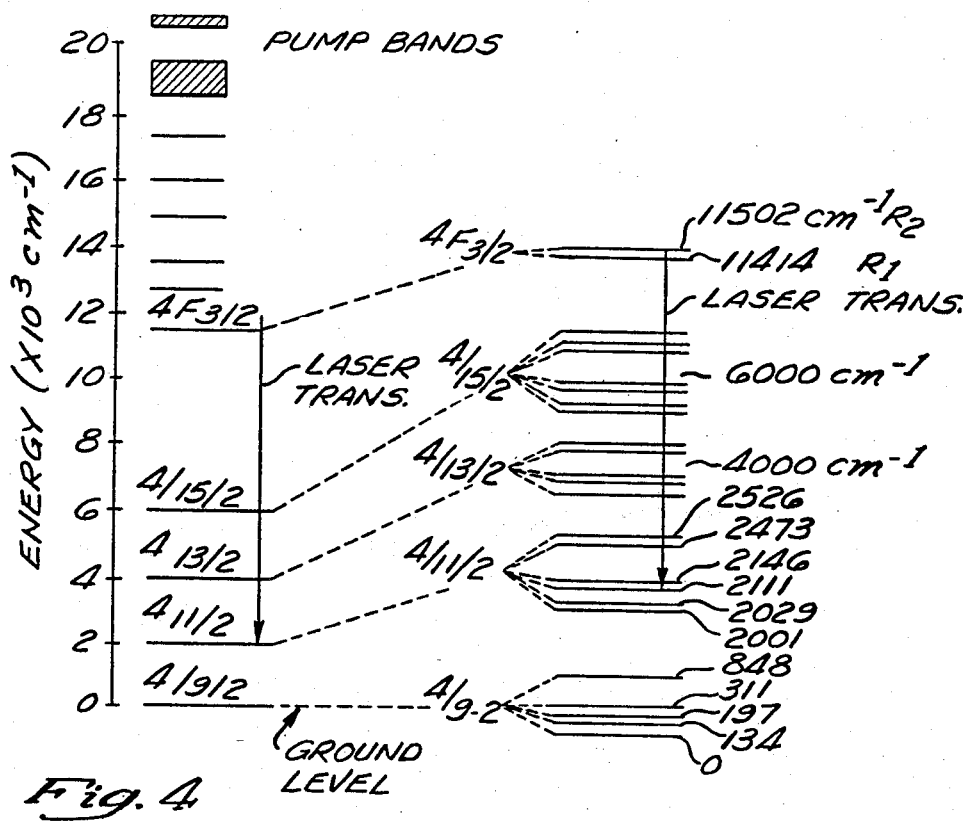
FIG. 4 is an energy level diagram of Nd:YAG.

FIG. 4 illustrates, in greater detail, the multiple energy states of Nd:YAG material, as well as the laser transition of this material, is used as an example in the following discussion.

An input light signal at the laser transition wavelength (e.g. 1.064 microns), i.e., one of the wavelengths of light emitted by the Nd:YAG ions during relaxation between the upper and the lower laser levels, travelling through the excited laser fiber 14 (FIG. 1) will trigger the emission of stimulated photons at the same frequency, coherent with the signal, and the signal is thereby amplified. Thus, the passage of light at this frequency will cause a photon emitting relaxation between the upper lasing level and lower energy level of FIG. 5A, in phase with the light signal to be amplified, yielding an effective gain for the input light signal.

The gain which can be achieved in the amplifier of this invention is dependent upon the density of the inverted neodymium ion population within the Nd:YAG crystal.

Theoretical calculations of the small signal gain coefficient per unit length $g_0$ of the amplifier of this invention can be made, using the relation $g_0 = \sigma \Delta N$, where $\sigma$ is the effective stimulated emission cross section, for Nd:YAG, about $3.0 \times 10^{-19}$ cm$^2$, and $\Delta N$ is the population inversion density given by:

$$\Delta N = (P_p/V)(t_f/h\nu_p) \tag{1}$$

where $P_p$ is the total pump power absorbed by the signal fiber 14, V is the crystal volume and thus, $P_p/V$ is the total absorbed pump power per unit of fiber volume, $t_f$ is the fluorescence lifetime of the upper laser level 2 of FIG. 5A, that is, the 230 microsecond fluorescence relaxation time of the neodymium ions, and $h\nu_p$ is equal to the pump photon energy.

The gain available from an amplifier fiber of length L may be expressed as:

$$\gamma_o = g_o L \tag{2}$$

Combining the above relationship provides:

$$\gamma_o = \sigma(P_p/A)(t_f/h\nu_p) \tag{3}$$

where A is the cross sectional area of the amplifier fiber.

It should be recognized that the value $P_p$ is the absorbed pump power and that an increase in the length of the fibers does not necessarily increase the gain. Thus, if the length of the fibers is sufficient so that the pumping radiation passing through the Nd:YAG fiber is essentially completely absorbed, then the value $P_p$ in this equation may be replaced by the input pump power. For a typical pump photon wavelength of 810 nm, $\gamma_0$ is equal to 0.01 dB for $P_p$ equal to 1 milliwatt in a single crystal fiber having a 120 micron diameter. To obtain the net gain, however, one must subtract from $\gamma_0$ the fiber propagation losses at 1.06 micron experienced by the signal as it propagates through the fiber 14. A fiber loss of 100 dB per kilometer would reduce the gain by only 0.001 dB per centimeter. Thus, if the overall length of the amplifier can be maintained relatively short, as by arranging to have most of the pump power substantially absorbed over a short length of fiber, the propagation losses within the amplifier can be maintained at a low level.

As is apparent from the previous description, and referring again to FIG. 1, it is preferable in order to properly pump the Nd:YAG fiber 14, that the pump sources 24, 26 be either continuously operated immediately before applicatin of an input signal to the fiber 14, that is, preferably within the 230-microsecond fluorescence relaxation time of the neodymium ions.

Referring again to FIG. 1, it should be noted that the Nd:YAG fiber 14, in the area adjacent to the end 18, 20 but outside of the jacket 22, will guide the signal before and after amplification, since the index of refraction $n_1$ is higher than that of the surrounding air. It may be advantageous, of course, to clad the Nd:YAG fiber 14 in these regions to reduce surface losses.

Similarly, the quartz fiber 12, in the region beyond the jacket 22, will guide the light from the pump sources 24, 26 since its index, $n_2$, is higher than that of the surrounding air. It is possible, of course, to also clad the quartz fiber 12 in this region to reduce surface losses, so long as the index of the cladding used in the region beyond the ends of the jacket 22 is lower than that of the quartz.

It will be recognized that the pumping light from the source 24 will tend to be initially absorbed near the end 18 within the amplifier system, and thus the length of the fiber 14 may not be uniformly illuminated by the source 24. Thus, the inverted population of neodymium ions may not be uniformly distributed along the length 16. Accordingly, it may be advantageous to pump the quartz fiber 12 at both ends simultaneously with the pump sources 24, 26 to assure that the inverted neodymium ion population will be symmetrical along the length 16. Also, pumping from both ends will yield more pump power in the jacket 14, and thus, more gain.

It should also be recognized that the pumping illumination supplied from the pump sources 24, 26 to the Nd:YAG fiber 14 should be sufficient, on a continuing basis, to replace the depleted population within the fiber 14 which occurs when the signals are amplified. Thus, for example, in a gyroscope where a pulse signal circulates through a kilometer of fiber, the counter-propagating signals will traverse the amplifier, shown in FIG. 1, approximately once each five microseconds. If continuous pump sources 24, 26 are used, they should provide sufficient output so that, during each five-microsecond period, they are capable of reinverting the neodymium ion population which has relaxed during each successive traverse of the signals, to reinvert a population equal to that which has relaxed, such that the amplifier gain experienced by the signals will remain constant.

The jacket 22 forms a high Q cavity which allows a single pump ray to make approximately 100 reflective passes through the Nd:YAG fiber 14 in a length of approximately 2 centimeters. Thus, although the path of the single ray laterally through the Nd:YAG fiber 14 is substantially shorter than an absorption length in that material, the plural passes permit the absorption of a substantial fraction of the pump source illumination within the Nd:YAG fiber 14.

It should also be recognized that the structure shown in FIG. 1 will provide an oscillator or source for illumination at the laser frequency of the Nd:YAG fiber if the ends 18 and 20 are properly mirrored. Thus, by placing a mirror on the end 18 of the fiber 14 which reflects nearly 100% of illumination at the laser frequency and by placing a second mirror on the end 20 of the fiber 14 which reflects a lower percentage of illumination at the same frequency, the structure shown in FIG. 1 may be used as a fiber laser source, with coherent light waves reflected back an forth through the length 16 within the fiber 14, and being emitted through the partially reflective mirror at the end 20, as coherent wave fronts of light at the laser frequency for the fiber.

When the structure, shown in FIG. 1, is used as a laser source, the pumping sources 24, 26 may provide steadystate light output at the pumping wavelength, in which case a steady state continuous light output will be provided by the fiber source. If, on the other hand, the pumping light from the light sources 24, 26 is modulated, a modulate output may be produced within the structure of FIG. 1.

As will be recognized from the above description, a proper selection of materials to provide indices of refraction which will guide the signal to be amplified within the signal fiber 14, but guide the pumping light only within the overall envelope 22 of the amplifier system, yields a small, relatively high gain amplifier system in which plural reflections within an overall cavity structure permit side pumping of the Nd:YAG fiber 14, even though the diameter of this fiber 14 is subsantially loss than the absorption length of the Nd:YAG material at the pumping wavelength.

As shown in FIG. 6, the pump sources 24, 26 (FIG. 1) each comprise a cone shaped rod 50 formed of e.g. amorphous quartz (fused silica), which tapers from a large end 52 to a small end 54. Projecting from the small end 54 is a fiber sized rod portion, which, in the preferred embodiment, comprises the pump fiber 12 (FIG. 1). Alternatively, the small end 54 may be butt-coupled to a separate fiber which serves as the fiber 12. By way of specific example, the large end 52 may have a diameter of about 2 mm, the small end 54 (and the fiber 12) may have a diameter of about 200 microns; the length of the tapered portion 56 between the end portions 52, 54 may be about 1 centimeter; and the taper angle $\theta$ may be about 5 degrees. It will be recognized that the drawings are not to scale, but only illustrative.

The cone shaped rod 50 may be manufactured using a quartz rod having a diameter equal to the diameter of the large end portion 52. The rod is heated in a high temperature flame and quickly pulled apart, reducing a portion of the rod to a fiber size diameter to provide the pump filber 12. The large end of the rod is then cleaved to provide a planar face 58 at the end portion 52 and this face 58 is polished. This process is thus similar to the process commonly used for forming pipettes. Those skilled in the art will recognize that more sophisticated manufacturing techniques are also available.

As shown in FIG. 6, plural light sources 60 are mounted on the planar end face 58 of the rod 50. Referring to FIG. 7, each of the light sources 60 comprises a microlens 62 and a miniaturized light emitting device 64, preferably a high power laser diode, which produces light in one of the high absorption regions shown in FIG. 3, such as the 800 nm region. As is well known in the art, microlenses are extremely small optical glass rods having focusing properties due to gradients of refractive index from center to periphery. They are available in various lengths, diameters, focal lengths, and acceptance angles under the brand name Selfoc Microlenses from Nippon Sheet Glass Company, Ltd., New Jersey office, 136 Central Avenue, Clark, N.J. The laser diode 64 is mounted on the microlens 62 with the laser diode junction close to the input face of the lens 62, and the lens properties are selected to collimate the light produced by the laser diode 64. Mounting of the laser diode 64 on the lens 62 may be accomplished by any suitable means, such as an adhesive or a mechanical mount. The lens, in turn, may be mounted on the face 58 of the cone shaped rod 50, for example, by means of optical cement. If desired, several laser diodes 64 may be "stacked" on a single lens 62 to further increase the power. In such case, the diodes may be placed one on top of another, with the lengthwise sides of the diodes toughing each other. Further, while the drawings show three such light sources 60 mounted on the cone shaped rod 50, it will be understood that more or less sources 60 may be utilized.

As shown in FIG. 8, as light enters the cone shaped rod 50, it undergoes multiple total internal reflections so as to focus and compress the light for coupling into the fiber 12. For clarity of illustration, only a single ray 68 is shown as entering the rod 50 in FIG. 8. It will be seen from FIG. 8 that due to the taper geometry of the cone shaped rod 50, the ray 68 makes total internal reflections at successively greater angles of incidence with respect to the wall of the cone 50, until the ray 68 enters the fiber 12, where the angle of incidence will stabilize. Such stabilization of the angle of incidence is due to the fact that the diameter of the fiber 12 is uniform. Those skilled in the art will recognize that the term "angle of incidence" defines the angle between the ray and a line drawn wound to the cone wall at the point of incidence of the ray. The cone angle $\theta$ and cone length should preferably be selected such that, as light passes through the cone 50, from the end 52 to the end 54, the angle of incidence is always greater than the critical angle (i.e., the angle at which the ray is no longer totally internally reflected), so that substantially all of the light entering the large end 56 of the cone 50 will be coupled to the fiber 12. In general, the required cone angle depends upon the ratio of the area of the input end face 58 relative to the cross sectional area of the fiber sized end 54, as well as the difference in index of refraction between the cone 50 and the surrounding medium (e.g., air). Mathematical techniques for calculating the cone angle are well known in the art, and are described e.g. in *Fiber Optics; Principles and Applications*, by N. S. Kapany, Academic Press (1967), pages 18–22.

Thus, the cone shaped rod 50, in effect, focuses the collimated light input by the light sources 60 (FIG. 7) into the small end 54, and therefore, compresses the light generated by the laser diodes into the pump fiber 12, thereby increasing the pump power density in the fiber 12.

If the particular diodes used as the laser diodes 64 have a poor degree of spacial coherence or are multimode, it will generally be impractical to make the length of the emitting area (i.e., the dimension parallel tothe laser diode junction) much larger than the radius of the fiber sized end 54; otherwise radiation losses may occur due to diffraction caused by the spacial incoherence or due to higher order modes become unguided. Unfortunately, present, commercially available, high power, diode lasers are typically either multimode, or have a relatively poor spacial coherence, or both. It is expected that this situation will be alleviated as advances are made in laser technology.

Referring to FIGS. 6 and 7, it will be understood that the laser diodes 64 may be utilized without a collimating lenses 62, so that light is input to the cone 50 directly from the diodes 64. In such case, however, the transmission losses will typically be greater than with a collimating lens, since laser diodes generally emit light in a diverging pattern, and the diverging rays may exceed the critical angle with respect to the walls of the cone 50, thereby causing radiation losses. Tests have shown that with uncollimated input beams (no microlens), transmission through the cone (i.e. the fraction of input light coupled to the fiber sized end 54) was no more than about 10 percent, while for collimated light (with microlenses) the transmission was increased to about 70 percent. Thus, use of the collimating microlenses 62 in combination with the laser diodes 64 is highly advantageous.

It also may be preferable to mount the light sources 60 at locations on the face 58 which are offset from the central axis 72 of the cone shaped rod 50 in order to excite higher order modes. It will be understood from the ray diagram of FIG. 8 that rays entering the face 58 near the periphery of the large end portion 56 (e.g. the ray 68) will have higher angles of incidence by the time they reach the fiber sized end 54 than corresponding rays (not shown) which are input closer to the central axis 72. According to ray theory, such increased angles of incidence are indicative of higher order modes. Such higher order modes may be advantageous for excitation of the Nd:YAG fiber of FIG. 1, since the rays (e.g. the ray 28) will make an increased number of reflections, and thus, an increased number of passes through the amplifier fiber 14 as it propagates from one end of the amplifier structure to the other.

For uncollimated light (no microlens), transmission through the cone shaped rod 50 appears to be substantially independent of the location of the laser diode on the face 58. However, in one experiment, it was found that for collimated light (with the microlens 62), transmission through the cone shaped rod 50 increased to a maximum as the light source 60 was moved away from the cone axis 72 towards to the periphery of the end portion 52. The optimum transmission position may be found by sliding one of the light sources 60 radially outward from the cone axis 72 on the face 58 until the power transmission, as measured at the end portion 54, is at a maximu. This source 60 may then be permanently mounted in this position. The same process may be utilized to locate the other sources 60. In addition, for optimum transmission when the diodes 64 are offset from the axis 72, it is preferable to orient each diode 64, so that the maximum dimension (i.e. length) of its emitting area is normal to an imaginary radial line 80 on the planar face 58, which passes through the axis 72.

Thus, the cone shaped rod 50 permits a high amount of optical power to be coupled to the pump fiber 12, particularly when such rod 50 is used in combination with high power laser diodes and collimating microlenses. Such high optical pump power increases excitation of the Nd:YAG crystal 14, and thereby enhances amplification.

Figure 9:
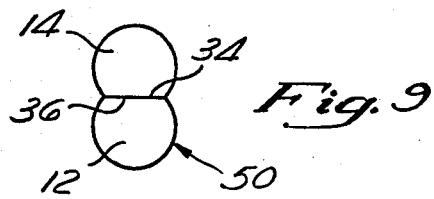
FIG. 9 is a sectional view taken along the lines 9-9 of FIG. 10, showing an alternate configuration for the amplifier.
Figure 10:
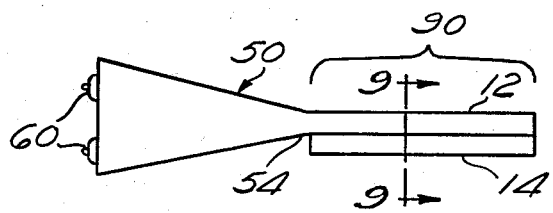
FIG. 10 is a diagram showing the physical arrangement of an alternative embodiment of the fiber amplifier of the present invention.

In an alternative embodiment of the side pumped amplifier of the present invention, the fiber 12 may be used without the jacket 22 to directly couple input light into the amplifier fiber 14. Accordingly, FIGS. 9 and 10 schematically show an alternate embodiment of an amplifier structure which does not utilize the jacket 22 of FIGS. 1 and 2, but relies instead upon the differential between the index of refraction of the Nd:YAG fiber 14 and the quartz fiber 12, on the one hand, and that of the surrounding air, on the other hand, to guide the pump light and signal light within the system. In this embodiment, both the fiber 14 and the fiber 12 of the cone shaped rod 50 are polished along one surface, (is best seen in FIG. 9), to provide planar outer surfaces 34 and 36 which are abutted throughout a length 90 (Figure 10) of desired interaction, (corresponding to the length 16 of FIG. 1), to provide an interaction region along such length 90.

With the arrangement shown in FIGS. 9 and 10, the index of refraction of the Nd:YAG fiber 14 should be higher than the index of refraction of the quartz rod 50 so that the signal to be amplified will be well guided within the fiber 14 by both the fiber-air interface and the fiber-quartz rod interface. On the other hand, the pump signal within the fiber 12 will be guided throughout that portion of its circumference which interfaces with the surrounding air, but will be unguided at the surface 36 and will thus propagate into the Nd:YAG fiber 14 to pump the neodymium ions in that fiber 14. It will also be recognized, of course, that the embodiment shown in FIGS. 9 and 10 may be provided within a surrounding jacket, such as the jacket 22 of FIG. 2, where the jacket has a lower index of refraction than either the quartz rod 50 or the Nd:YAG fiber 14. This surrounding jacket will not alter the basic operation of the device, but will eliminate surface scattering caused by surface irregularities.

What is claimed is:

1. An improved fiber optic amplifier, comprising an optical laser fiber, formed of a laser material, the improvement comprising an apparatus for providing light to pump said optical laser fiber, comprising:
   a cone shaped rod, comprising:
      a first fiber sized end for
      coupling light to said laser fiber:
      a second end having a diameter substantially larger than said first end and having an end face for receiving light; and
   means for preferentially introducing pump light into said end face of said second end at a location which is offset from the central axis of said cone shaped rod to non-uniformly illuminate said end face to preferentially excite high order modes in said cone shaped rod, said cone shaped rod focusing said pump light from said second end to said first fiber sized end for introduction to said laser fiber to pump said laser material and cause an electronic population inversion in said laser material.

2. A fiber optic amplifier, as defined in claim 1, wherein the improvement additionally comprises a pump fiber, said fiber size end optically coupled to introduce light into said pump fiber, said pump fiber juxtaposed with said laser fiber to form an interaction region for coupling light from said pump fiber to said laser fiber to pump said laser material.

3. A fiber optic amplifier, as defined in claim 2, wherein said pump fiber and said laser fiber each include respective planar surfaces along at least a portion of their length, said planar surfaces juxtaposed to form said interaction region.

4. A fiber optic amplifier, as defined in claim 2, the improvement additionally comprising:
   a second cone shaped rod, comprising:
      a first fiber sized end, for introducing light into the other end of said first fiber;
      a second end, having a diameter substantially larger than said first end of said second rod; and
   second means for introducing pump light into said second end of said second rod, said second cone shaped rod focusing said pump light into said first fiber sized end of said second rod for introduction into said other end of said pump fiber and for propagation through said pump fiber to said interaction region to pump said optical laser fiber and cause an electronic population inversion in said laser material.

5. A fiber optic amplifier, as defined by claim 1, wherein said means for introducing pump light produces substantially collimated light.

6. A fiber optic amplifier, as defined in claim 5, wherein said means for introducing pump light comprises:
   a laser diode; and
   a collimating microlens, disposed between said laser diode and said second end.

7. A fiber optic amplifier, as defined in claim 6, wherein said laser diode is oriented such that its lengthwise dimension is normal to a radial line passing through said axis of said cone shaped rod.

8. A fiber optic amplifier, as defined in claim 5, wherein the length of the emitting area of said laser diode is no greater than the radius of said first fiber sized end.

9. A fiber optic amplifier, as defined in claim 1 wherein said light source comprises plural laser diodes.

10. A fiber optic amplifier, as defined in claim 1, wherein said cone shaped rod is comprised of glass and said laser material is comprised of Nd:YAG.

11. An improved method of pumping an optical fiber, formed of laser material, the improvement comprising:
   supplying pump light to the end face of one end of a cone shaped rod by mounting a pump light source to preferentially introduce said pump light at a location removed from the central axis of said cone shaped rod to nonuniformly illuminate said end face to preferentially excite high order modes at the other end of said cone shaped rod; and
   optically coupling the other end of said cone shaped rod to pump the laser material of said optical fiber to cause a population inversion in said laser material.

12. A method of pumping an optical amplifier as defined in claim 11, the improvement additionally comprising the step of:
   collimating said pump light supplied at said one end of said cone shaped rod.

13. A method of pumping an optical amplifier, as defined in claim 12, wherein said light source comprises a collimating microlens and a laser diode.

* * * * *